United States Patent [19]
Youden et al.

[11] Patent Number: 5,220,749
[45] Date of Patent: Jun. 22, 1993

[54] GRINDING APPARATUS

[75] Inventors: David H. Youden, Nelson; Mark C. Gerchman; Daniel L. Denery, both of Keene, all of N.H.; Jyrkl T. Liedes, Leominster, Mass.

[73] Assignee: The University of Rochester, Rochester, N.Y.

[21] Appl. No.: 789,243

[22] Filed: Nov. 7, 1991

[51] Int. Cl.⁵ .............................................. B24B 7/00
[52] U.S. Cl. ...................................... 51/3; 51/166 T; 51/168; 51/209 R; 51/283 R
[58] Field of Search ...................... 51/168, 169, 181 R, 51/3, 206 R, 209 R, 116 TS, 166 T

[56] References Cited

U.S. PATENT DOCUMENTS

| | | | |
|---|---|---|---|
| 726,378 | 4/1903 | Tucker | 51/206 R |
| 1,364,625 | 1/1921 | Eriksen | 51/206 R |
| 2,133,232 | 10/1938 | Streby | 51/181 R |
| 3,872,630 | 3/1975 | Ali . | |
| 4,210,038 | 7/1980 | Hill . | |
| 4,388,781 | 6/1983 | Dodd | 51/206 R |
| 4,528,743 | 7/1985 | Bleich | 51/168 |
| 4,545,154 | 10/1985 | Sekiya . | |
| 4,604,835 | 8/1986 | Borin . | |
| 4,624,081 | 11/1986 | Janutta . | |
| 4,654,953 | 4/1987 | Hobbs | 51/168 |
| 4,677,792 | 7/1987 | Speidel . | |
| 4,835,912 | 6/1989 | Block . | |
| 4,872,292 | 10/1989 | Block . | |
| 4,882,880 | 11/1989 | Schaffner . | |
| 4,907,374 | 3/1990 | Brill | 51/168 |
| 4,969,299 | 11/1990 | Block . | |

FOREIGN PATENT DOCUMENTS 2177329 1/1987 United Kingdom ............ 51/181 R

Primary Examiner—Robert A. Rose
Attorney, Agent, or Firm—M. LuKacher

[57] ABSTRACT

Apparatus is described for grinding glass to form optical elements, especially prisms. The apparatus has an improved mounting for grinding wheels which are used for different grinding purposes, specifically roughing, finishing and polishing. The finishing wheel is usually an expensive, diamond-abrasive wheel which is trued to provide finishing grinding operations with high accuracy. The finishing wheel, which can be used for the critical final grinding of the workpiece, is semi-permanently mounted on the grinding machine spindle in a manner which allows the less critical roughing (semi-finishing) and polishing wheels to be temporarily mounted in front of the finishing wheel in interlocked, stacked relationship therewith without disturbing the truth of rotation of the finishing wheel. When the finishing wheel is used alone, a plug is inserted in a socket, which receives a shank extending from the other wheels, so as to prevent dirt from entering the socket. The apparatus enables the required accuracy of rotation of the finishing wheel to be maintained while significantly reducing the time and cost of grinding operations by avoiding the need for repeatedly remounting and truing the finishing wheel.

30 Claims, 8 Drawing Sheets

GRINDING APPARATUS

DESCRIPTION

The present invention relates to grinding apparatus and particularly to improved grinding apparatus in which a plurality of grinding elements are used interchangeably in a manner which provides the required accuracy of grinding while reducing the time and cost of grinding operations.

The invention is especially suitable for use in a precision grinding machine for grinding glass workpieces to produce optical elements, such as prisms and the like, with high accuracy. Aspects of the invention may also be found applicable wherever a plurality of grinding operations with different grinding elements, such as different grinding wheels which grind or polish to different degrees of accuracy, are used.

Grinding of optical elements requires accuracies of finish in the nanometer range or better. Grinding glass also requires expensive grinding elements such as diamond wheels. When finish grinding high precision parts, it is necessary to limit the runout of the grinding wheel to an accuracy better than the accuracy to which the workpiece is required to be ground. Therefore, it is conventional to true a finish grinding wheel in place on the spindle which rotates the wheel during grinding operations. Roughing or semi-finishing and polishing wheels are also used in grinding operations. Such polishing wheels usually have polishing pads with a urethane or other soft surface which retains the polishing compound. Heretofore, the roughing or semi-finishing wheel, the polishing wheel and the finishing wheel, which is used for the critical final grinding of the workpiece, were separately placed on the spindle of the grinding machine. While roughing and semi-finishing wheels are less critical than the finishing wheel to the process of grinding the workpiece and also polishing wheels can be interchanged without re-truing, every time the grinding machine was fitted with a finishing wheel, the wheel had to be re-trued. Such wheels, especially when they use diamond abrasive, are expensive and difficult to true. Also each time the wheel is trued, part of the diamond contents thereof is lost, and the life of this expensive component is undesirably shortened.

It is the principal object of the present invention to provide improved grinding apparatus in which grinding elements can be interchanged without the need for re-truing the element used for the critical, high accuracy final grinding of the workpiece.

It is a further object of the invention to provide improved grinding apparatus in which a plurality of grinding wheels can be interchanged in a manner which provides the required accuracy of rotation and of the finished surface of the workpiece while significantly reducing the time and cost of truing the finishing wheel thereby reducing the overall time and cost of grinding operations.

It is a still further object of the present invention to provide improved grinding apparatus in which a plurality of different grinding elements (such as grinding wheels) or one of the wheels, particularly the finishing wheel, may be mounted in assembled relationship with the spindle; the mounting of the finishing wheel being in a manner which enables the assembly of other wheels or of a plug which prevents the entry of undesirable materials, such as dirt and grit, which could unbalance the finishing wheel and/or affect its accuracy of rotation and the accuracy of the surface of the workpiece being ground by the finishing wheel.

Briefly described, apparatus for grinding workpieces which embodies the invention utilizes a first grinding element having a first grinding surface which is adapted to be trued for high accuracy grinding. The element may be a grinding wheel mounted on the spindle of the grinding apparatus. The wheel has an annular member which presents the grinding surface and which is adapted to be trued to provide the required accuracy of rotation and of the surface being ground. The wheel has a socket, preferably along the axis of rotation of the spindle which faces forwardly. At least a second grinding element (a second grinding wheel for rough or semi-finishing or polishing operations) has a shank receivable in the socket, and when so received, the first and second grinding wheels are disposed interlocked in stacked relationship. A plug may be inserted in the socket to prevent entry of undesirable materials when the first grinding wheel is used alone for finishing operations. The first wheel is semi-permanently mounted (it may be removed as by means of bolts for replacement, which is normally infrequent). Thus the required accuracy of rotation is obtained while significantly reducing the time and cost of truing the finishing wheel. A wheel/plug changer may be used to selectively mount the plug, the roughing wheel or the polishing wheel in the socket.

The foregoing and other objects, features and advantages of the invention and a presently preferred embodiment thereof will become more apparent from a reading of the following description in connection with the accompanying drawings in which:

FIG. 9 is a perspective, exploded view of the apparatus for mounting the various wheels and/or plug;

Figure 1:
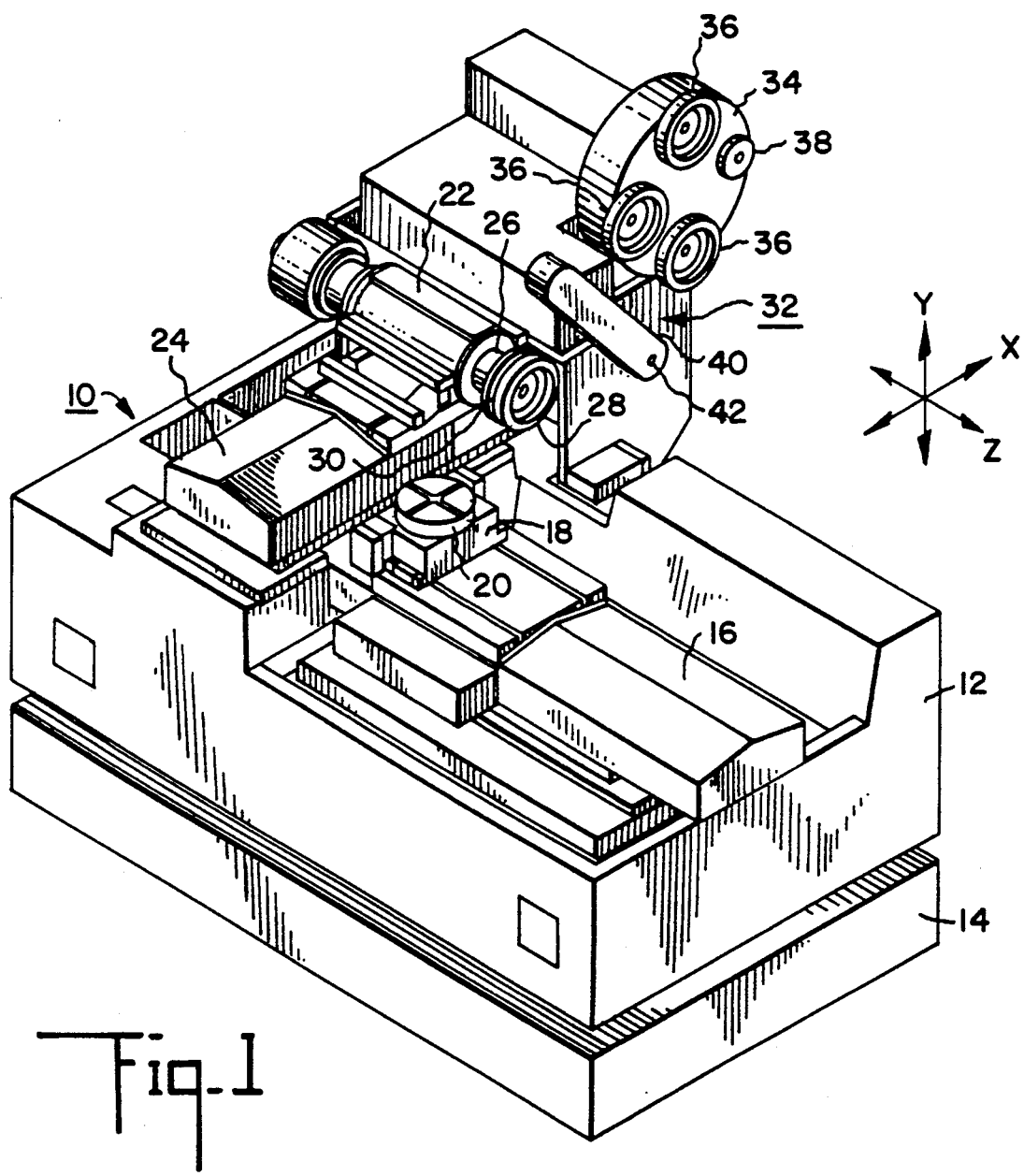
FIG. 1 is a simplified perspective view illustrating a grinding machine for high precision plural axis grinding of glass, optical elements.
Figure 2:
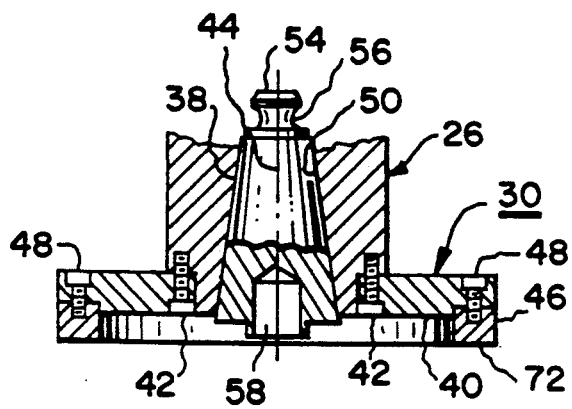
FIGS. 2 through 5 are schematic diagrams illustrating the apparatus provided by the invention in particularly the finishing wheel, the roughing or polishing wheel, the plug, and the assembly with the roughing wheel in place and with the plug in place.
Figure 6:
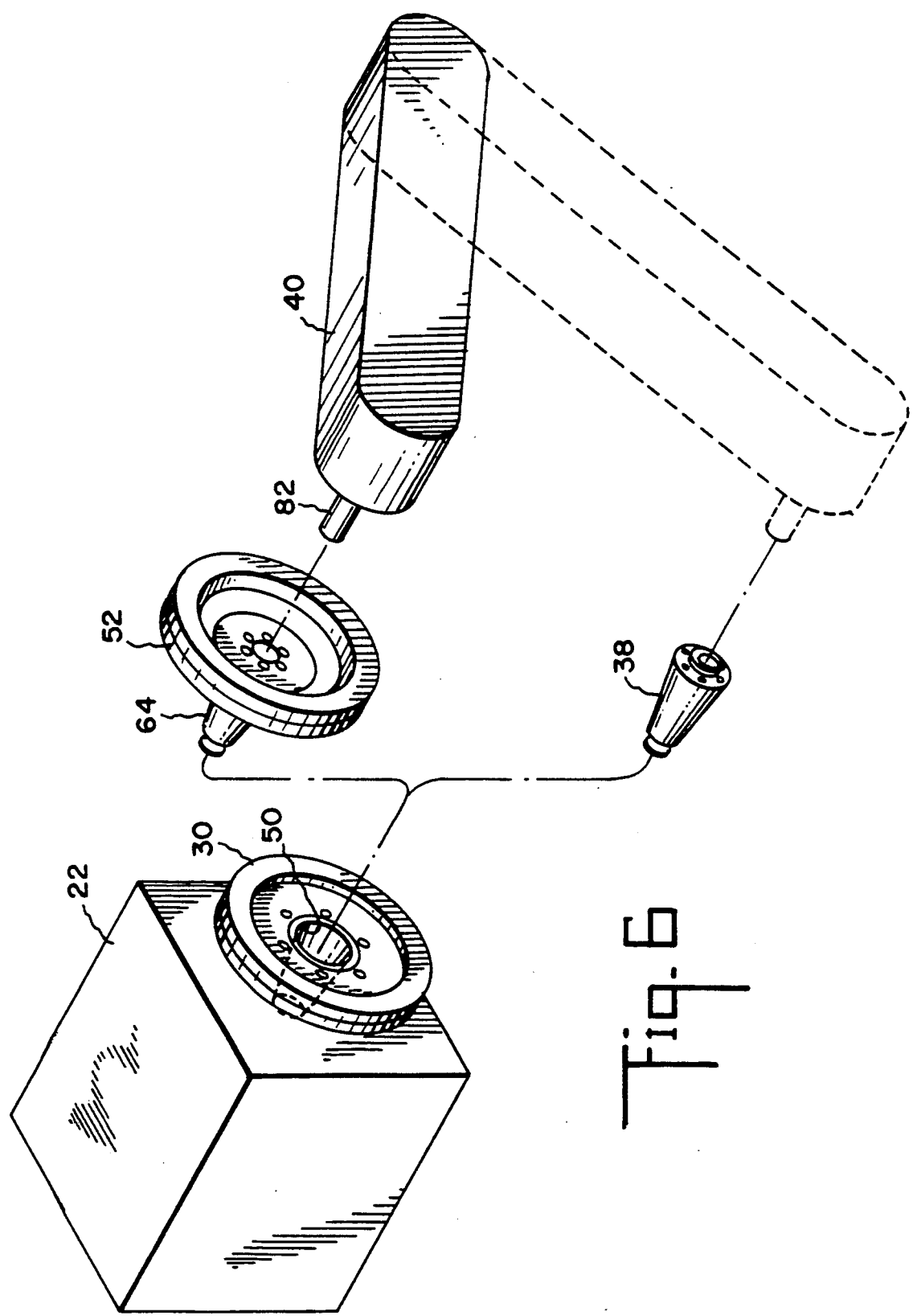
FIG. 6 is a perspective view schematically illustrating the interchangeability of the finishing/polishing wheels and the plug in interlocked relationship with the finishing wheel by means of a changing device.
Figure 7:
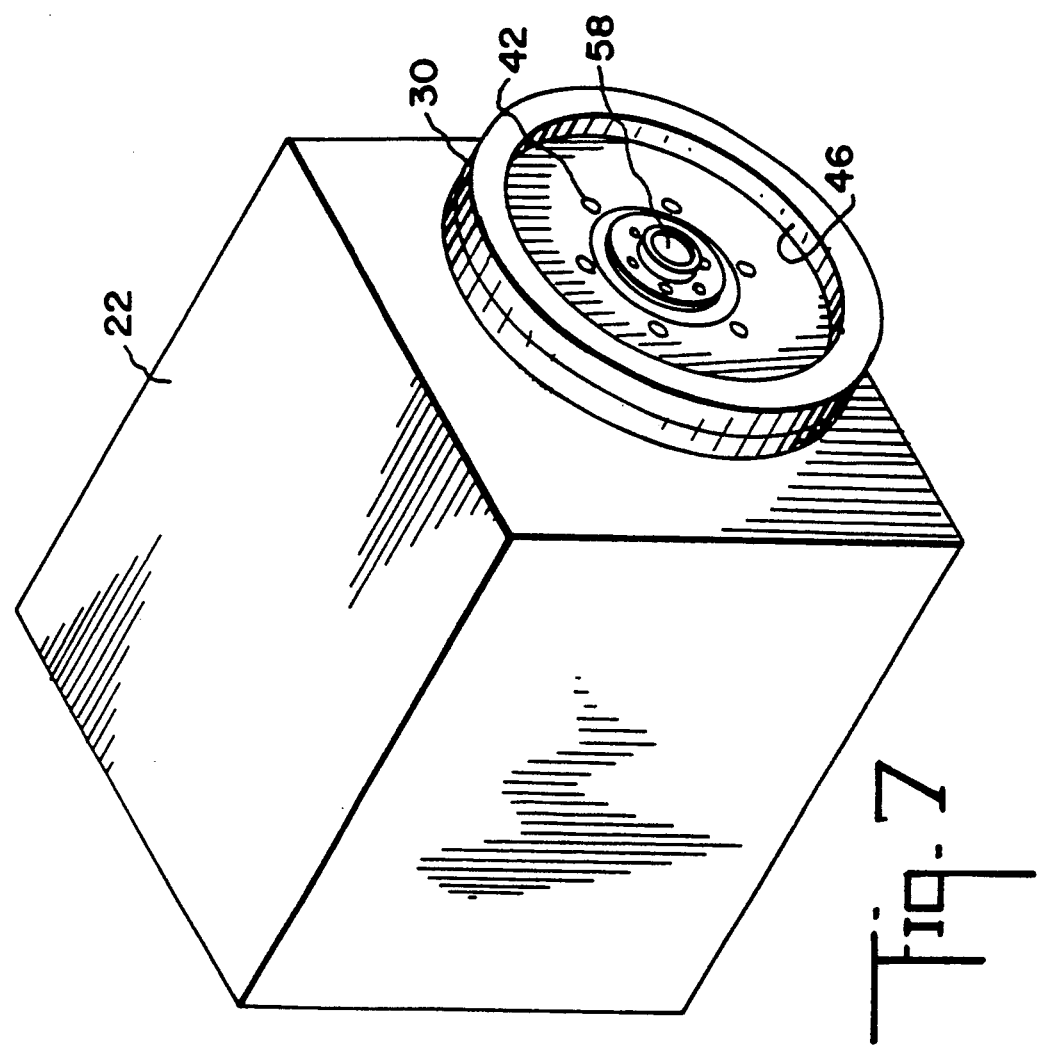
FIG. 7 is a perspective view showing the spindle portion of the grinding machine with the finishing wheel in place.
Figure 8:
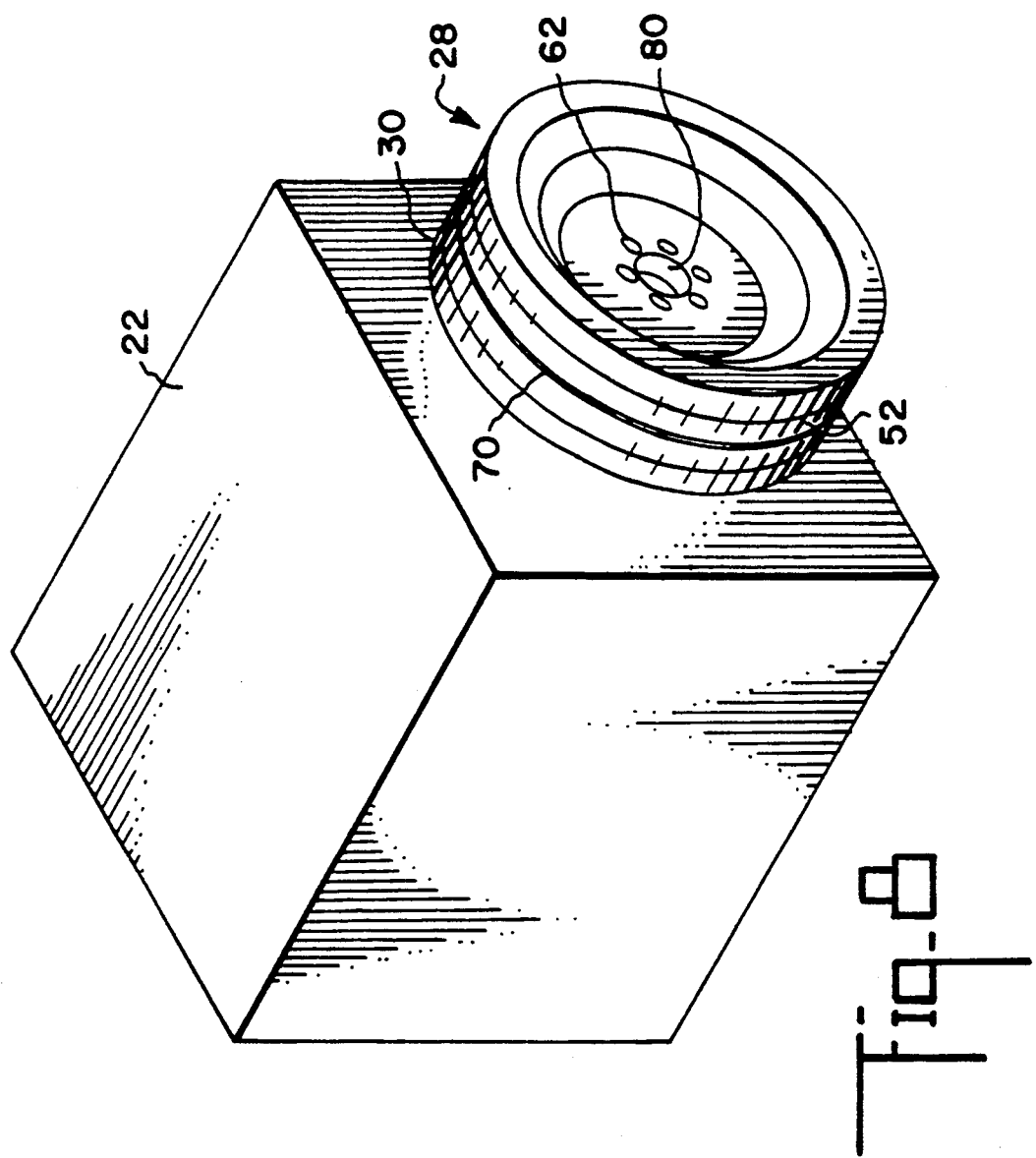
FIG. 8 is a perspective view similar to FIG. 7 also showing the roughing or polishing wheel in place.
Figure 6:
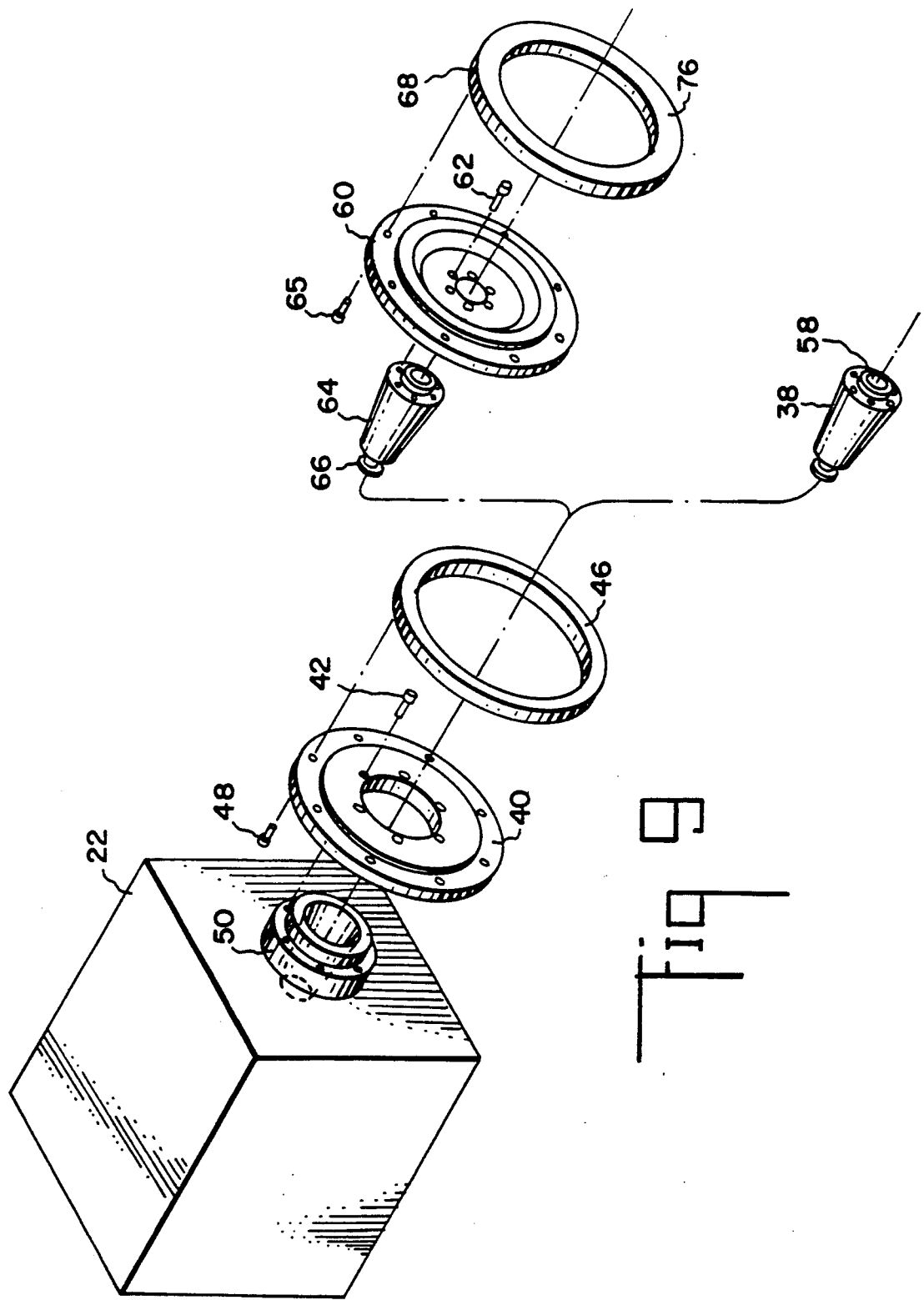
Figure 10:
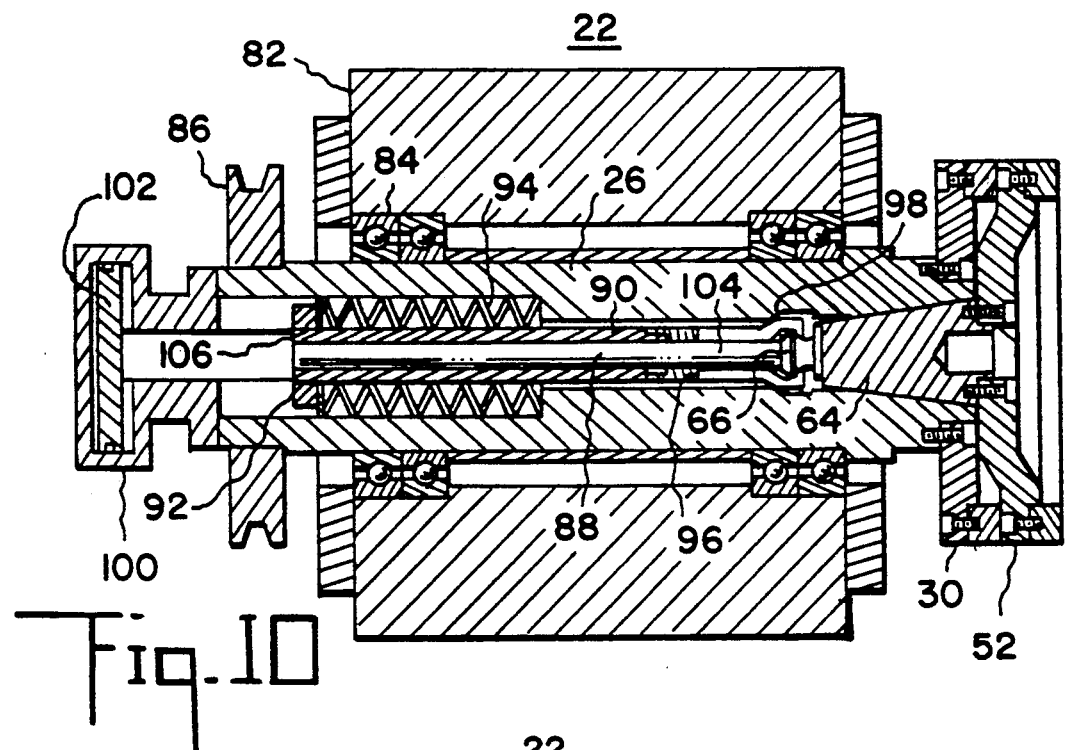
Figure 11:
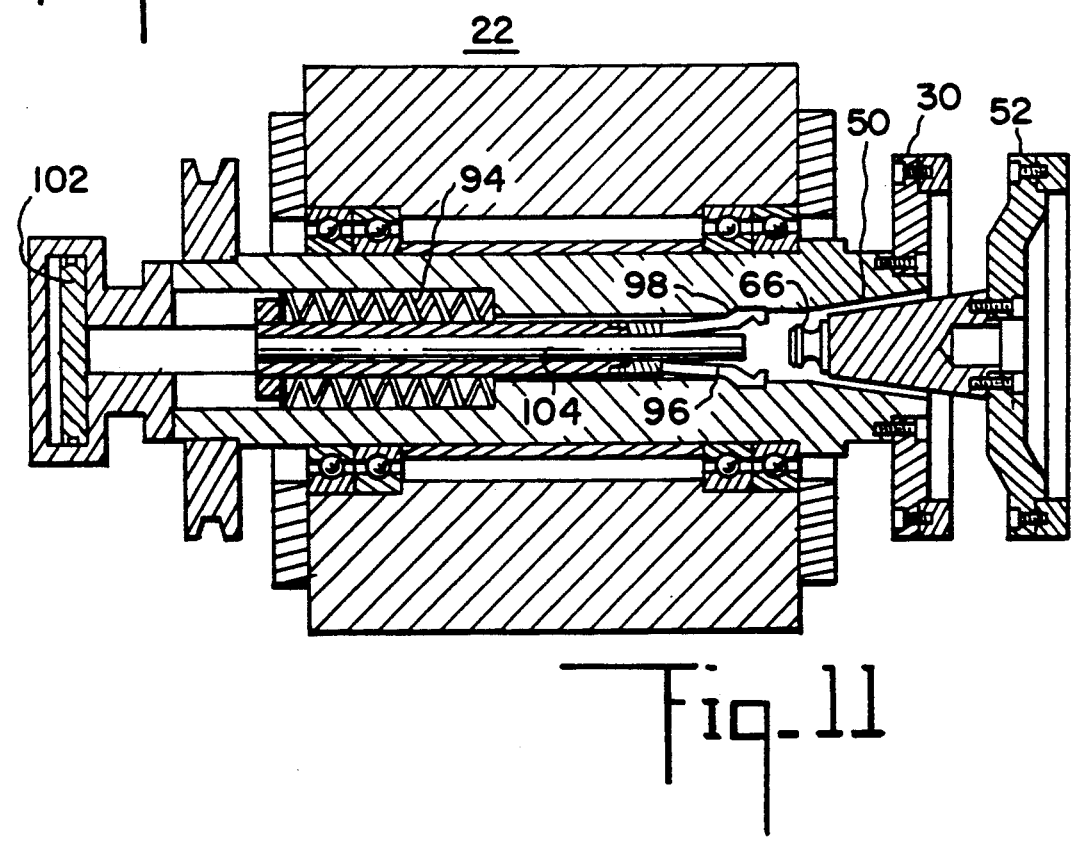
Figure 12:
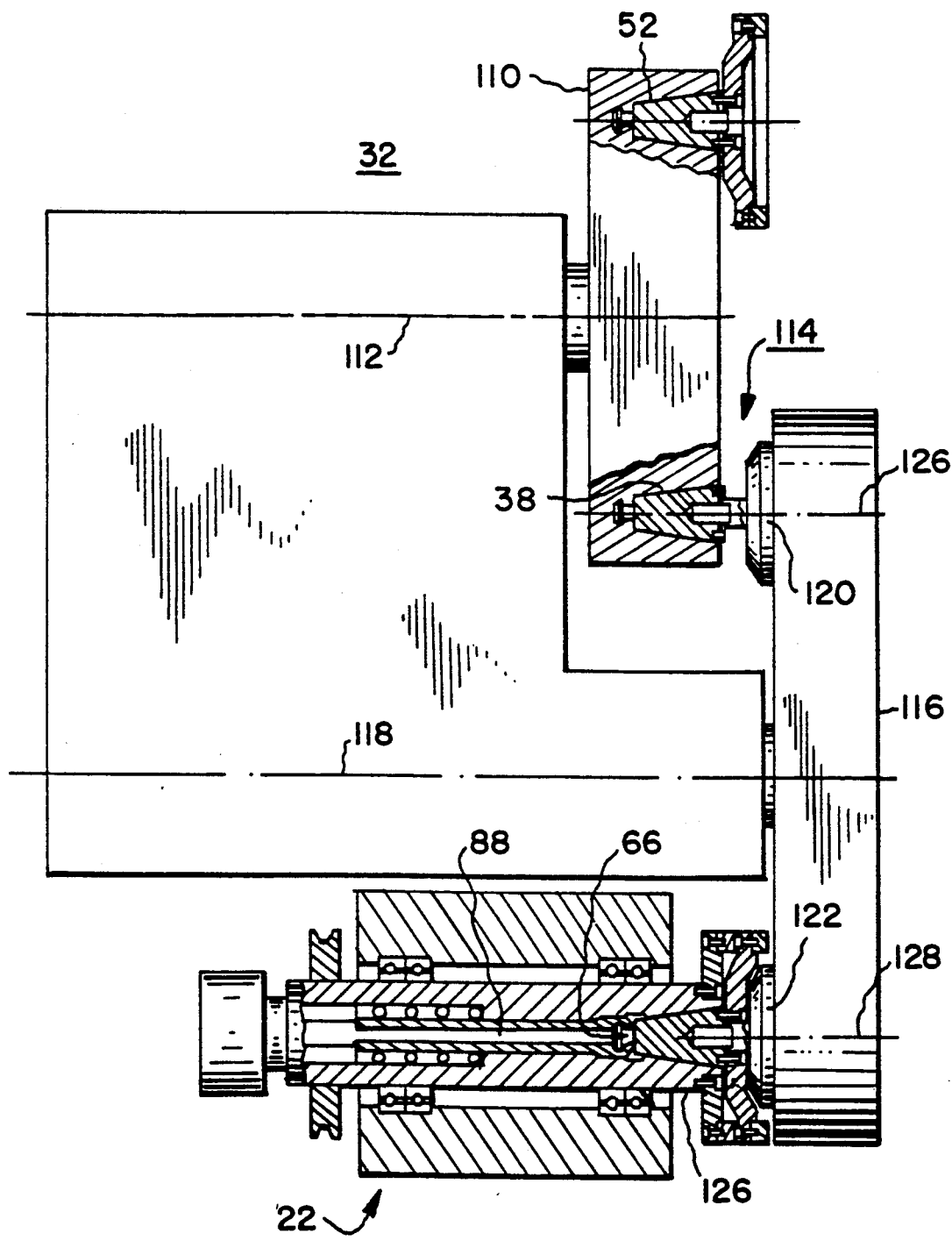

FIGS. 10 and 11 are simplified sectional views taken along the axis of the spindle of the grinding machine showing the operation of interchanging the wheels, FIG. 10 showing the wheels in connected (chucked) relationship and FIG. 11 showing the wheels in the process of being interconnected (in unchucked relationship); and FIG. 12 is a schematic view of the spindle and tool changer of a grinding machine, in accordance with the invention, wherein a grinding wheel changer is implemented with an interchange arm which rotates about an axis through the center thereof, rather than an arm which rotates about an axis near one end thereof (as shown in FIG. 1 and FIG. 6).

Referring to FIG. 1, there is shown grinding apparatus embodying the invention in the form of a two-axis high precision reciprocating grinding machine 10. The machine 10 is designed for automated manufacturing of glass prisms. It may be used for manufacturing other optical devices. The machine has a bed 12 mounted on isolation vibration devices on a support slab 14. The bed has a slide 16 which mounts a workpiece holder 18. The workpiece holder 18 is movable along the Z axis of the machine on the reciprocating slide 16. The workpiece (not shown) is mounted in the jaws 20 of the holder. The jaws 20 are on a table which can be indexed about a Y axis perpendicular to the Z axis and also perpendicular to an X axis along which a spindle assembly 22 is mounted for reciprocating motion on a slide 24. The spindle assembly 22 includes a spindle 26 on which a plurality of grinding elements, shown as grinding wheels 28 are mountable in stacked, interlocked relationship. A finishing wheel 30 is semi-permanently mounted on the spindle 26. This wheel in a preferred embodiment of the invention is a diamond-abrasive wheel which presents a grinding surface facing forwardly. The other wheels present grinding surfaces which also face forwardly. The term grinding surface as used herein also includes polishing and other abrasive surfaces for forming operations. The finishing wheel need only be trued when it is new by a tool mounted on the workpiece holder 20.

A tool changer 32 is located on the side of the machine. It includes a rotary disk 34 carrying three roughing or polishing wheels 36 and a plug 38. An interchange arm 40, which rotates on a pivot 42 near one end thereof has a pickup mechanism including an expanding arbor which transfers the grinding wheels and the plug between the spindle 26 and the wheel changer disk 34.

Referring to FIGS. 2 through 5 (see also FIG. 9), the finishing wheel 30 is shown. It is made up of a disk 40 of metal, such as aluminum, which is attached to the forward end or nose of the spindle 26 by a plurality of bolts 42. There may be six bolts as shown in FIG. 6 equally spaced (60° apart) around the inner periphery of the disk 30. The disk 30 is mounted coaxial with the spindle axis 44. An annular body 46 or ring of abrasive material (diamond particles held in a matrix of metal or of plastic resin) is attached by a plurality of bolts 48, for example six bolts equally spaced around the disk. The axis of the disk 46 is common to the axis of the spindle 44.

The nose of the spindle has a tapered (conical) opening 50 which is filled by a tapered plug 38 having a knob 54 with a neck 56 at the rear end thereof. The plug has a blind bore 58 at the forward end thereof. The plug 38 serves to fill the opening 50 and prevent undesired materials such as grit and dirt from entering the opening 50 and accumulate therein. This avoids unbalanced conditions which may cause undesired runout of the wheel 30.

Figure 4:
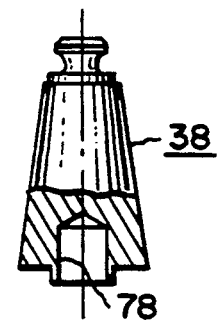
Figure 3:
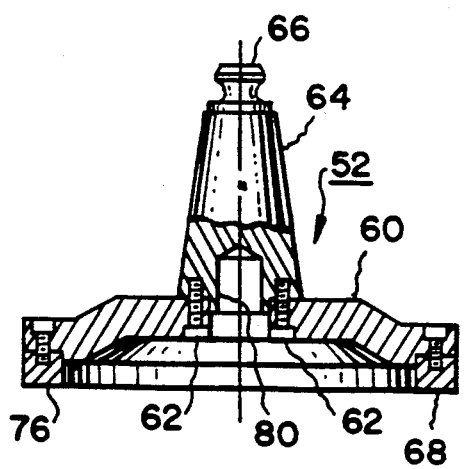

The wheel 30 is used alone or as part of an assembly 28 with a roughing or polishing wheel, an exemplary roughing or polishing wheel 52 is shown in FIGS. 3 and 4. Both the finishing wheel and the roughing or polishing wheel are of the same diameter. The roughing or polishing wheel has a disk 60 which is dish-shaped and mounted by a plurality of bolts 62 to a tapered shank 64 of the same conical shape as the plug 38. The tapered shank also has a neck knob 66 at the rear end thereof. The shank 64 provides a means of attachment of the roughing or polishing wheel 52 in stacked interlocked relationship with the finishing wheel 30 on the spindle 26. By the term "shank" is meant a device at the rear side of the roughing or polishing wheel 52 which enables it to be received in an opening, such as the opening 50 in the nose of the spindle 26.

The roughing or polishing wheel has, in the case where the wheel is a roughing wheel, an annular body or ring 68 of abrasive material. Polishing wheels have a ring-shaped pad of urethane or other material having a soft surface which can be coated with polishing compound. Bolts 65, in a manner similar to the bolts 48, attach the body 68 to the support dish 60.

Figure 5:
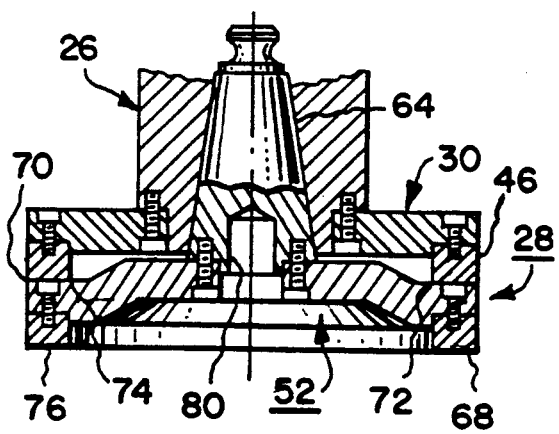

The dimensions of the shank 64 and the shape of the support dish 60 are such that a small gap 70 (an annular or ring-shaped gap too small to be drawn to scale in FIG. 5) is defined between the grinding surface 72 of the abrasive ring 46 of the roughing or polishing wheel and the rear side 74 of the roughing or polishing wheel 52. The roughing or polishing wheel 52 also has a grinding surface 76. When the interlocked stacked wheel assembly 28 is mounted on the spindle 26 or when the finishing wheel 30 alone is mounted on the spindle, the wheel, as it rotates and travels along the X axis, grinds the workpiece. In the case of glass prisms, each face of the prism is indexed as the index table 20 (FIG. 1) turns. And the grinding wheel and spindle assembly 22 reciprocates along the X axis and grinds the surface of the workpiece to which the grinding surface 72 or 76 is presented.

The plug 38 has a blind bore 78. The roughing or polishing wheel 52 also has a blind bore 80. These bores 58, 78 and 80 are engaged by an expanding arbor or plug 82 on the rear side of the end of the interchange arm 40 which is used to grasp either the roughing or polishing wheel 52 or the plug when they are ejected or unchucked from the spindle as shown in FIG. 11.

FIGS. 6, 7, 8 and 9 show the spindle 22 as a rectangular box. This box contains the spindle 26, the bearings for rotatably supporting the spindle, a drive for the spindle and a mechanism, for holding or chucking and ejecting or unchucking, the plug and/or the roughing or polishing wheel so that they can be transferred between the wheel holder 34 (FIG. 1) and the spindle 26. FIGS. 6 to 9 show the parts discussed in connection with FIGS. 2 to 5 as well as the positional relationship thereof. The design of these parts and their assembly will be readily apparent from FIGS. 6 to 9 as well as from FIGS. 2 through 5.

Referring to FIGS. 10 and 12, the spindle assembly 22 is shown as containing a wheel head 82 which is mounted on the slide 24. This wheel head supports the spindle 26 in bearings 84. These bearings are shown as ball bearings. However, air bearings are presently preferred.

The spindle drive is shown as a pulley 86 for purposes of illustration. Preferably, the drive is an electric motor having its stator mounted to the wheel head and its rotor directly connected to the spindle 26.

The ejection mechanism for the roughing or polishing wheel 52 and the plug is a double action holding and ejection mechanism 88. It includes a draw bar 90, which is a tube with a disk 92 at the rear end thereof. This disk captures a heavy (e.g. 1,000 pound) expansion spring 94. The draw bar has a jaw assembly 96 at the forward end thereof. The spring 94 biases the draw bar rearwardly. This cams the jaws 96 back against an annular cam surface 98 of the spindle. The jaws clamp around the neck of the knob 66 and securely hold the plug 38 or the wheel 52 in place in the spindle. The holding force and the frictional force between the tapered shank 60 and the opening 50 in the nose of the spindle 26 provide a secure connection interlocking the wheel or plug in the hole 50 when it is in the interlocked or chucked position as shown on FIG. 10.

An actuator 100, in the form of a hydraulic cylinder having a piston 102, is part of the ejection part of the mechanism 88. This piston attached to a push rod 104 having a step 106 where it engages the rear end of the disk 90 of the draw bar. When the piston 102 is advanced to the position shown in FIG. 11, the spring 94 is compressed and the draw bar is pushed forward so that it clears the cam surface 98. The jaws 96 are then released. The ejection mechanism has another action in that the push rod extends forwardly so as to push forward the top of the knob 66 and eject the wheel 52 from the opening 50. The wheel can then engage the expanding arbor and be transferred to the holder 34 of the changer mechanism 32 (FIG. 1).

Referring to FIG. 12 there is shown another implementation of the tool changer 32. This implementation includes a storage disk 110 for roughing or polishing wheels 52 and for a plug 38. The storage disk 110 is rotatable about an axis 112 to bring either a wheel or a plug to a transfer position 114 which is the position of the plug 38 shown in FIG. 12. The transfer arm 116 is rotatable about an axis 118. It has two expanding arbor assemblies 120 and 122 which are near opposite ends of the arm. The axis 126 and 128 are near opposite ends of a diameter which extends through the axis 118 so that the arbor assemblies 120 and 122 are diametrically opposite each other. The arbor assemblies 120 and 122 are movable with the tool changer 32 along the Z axis of the machine (i.e. in the same direction as the axis of rotation 112 and 118).

The transfer mechanism 32 then moves rearwardly so as to bring the expanding arbors into the openings in the unit (a wheel or a plug, a plug 38 being shown in FIG. 12) and into the opening in the tapered shank of the wheel or plug in the spindle 26. The ejection mechanism 88 is activated in synchronism with the forward movement of the changer 32. The units in the storage disk 110 and in the spindle are then removed.

The arm 116 rotates 180° to effect transfer of the unit in the spindle to the storage disk 118 and the unit in the storage disk to the spindle. The ejection mechanism is then moved rearwardly to insert the units in the storage disk and in the spindle. The ejection mechanism is released and the draw bar operates to engage the knob 66 on the shank 64 and lock the plug or roughing or polishing wheel in position in the spindle 26. The apparatus therefore provides rapid interchange of wheels while maintaining the required accuracy of rotation of the finishing wheel and the time and cost of truing the finishing wheel.

Variations and modifications in the herein described grinding apparatus, within the scope of the invention, will undoubtedly suggest themselves to those skilled in the art. Accordingly the foregoing description should be taken as illustrative and not in a limiting sense.

We claim:

1. Apparatus for grinding work pieces which comprises a spindle having an end facing said workpieces, an annular first grinding element having a given diameter and being attachable to said spindle at said end, said first grinding element having a first grinding surface on one side thereof which also faces said workpieces and which is adapted to be trued for high accuracy grinding when attached to said spindle, a socket in said spindle open on said one side of said element, at least a second annular grinding element having a diameter about equal to the diameter of said annular first element and having a second grinding surface on one side thereof and a shank receivable in said socket on another side thereof, said first and second grinding elements being disposed overlying each other and interlocked in overlapping stacked relationship when said shank is disposed in said socket presenting said second grinding surface to said workpieces for grinding said workpieces to a first accuracy, and, where said second element and its shank is removed from said socket, said first grinding element presenting said first grinding surface to said workpieces for grinding said workpieces to a second accuracy higher than said first accuracy.

2. The apparatus according to claim 1 further comprising a plug receivable in said socket when said second element is removed from said socket to protect said socket against entry of undesirable materials, including dirt and grit released during grinding.

3. The apparatus according to claim 1 wherein said one side of said second element and said another side thereof are respectively a front and a backside of said second element, said back side being in opposed facing relationship with said first grinding surface said socket and shank are dimensioned to define an annular gap spacing said first grinding surface from said backside.

4. The apparatus according to claim 2 further comprising a third element having a third surface on a front side thereof which third surface is engagable with said workpieces for operating upon said workpieces, said third element having a shank on a back side thereof receivable in said socket instead of said second element's shank.

5. The apparatus according to claim 4 wherein said first element has means which finish grinds said workpieces, said second element has means which rough grinds said workpieces, and said third element has means which polishes said workpieces.

6. The apparatus according to claim 1 wherein said elements are wheels for providing grinding operations selected from the group consisting of finishing, roughing or semi-finishing, and polishing, and said first element being attached to said spindle.

7. The apparatus according to claim 2 wherein said elements are wheels for providing grinding operations selected from the group consisting of finishing, roughing or semi-finishing, and polishing, and said first element being attached to said spindle.

8. The apparatus according to claim 3 wherein said elements are wheels for providing grinding operations selected from the group consisting of finishing, roughing or semi-finishing, and polishing, and said first element being attached to said spindle.

9. The apparatus according to claim 4 wherein said elements are wheels for providing grinding operations selected from the group consisting of finishing, roughing or semi-finishing, and polishing, and said first element being attached to said spindle.

10. The apparatus according to claim 5 wherein said elements are wheels for providing grinding operations selected from the group consisting of finishing, roughing or semi-finishing, and polishing, and said first element being attached to said spindle.

11. The apparatus according to claim 1 wherein said elements are wheels for providing grinding operations selected from the group consisting of roughing, semi-finishing and polishing and further comprising means for selectively removing said second element and selectively inserting and removing a plug from said socket.

12. The apparatus according to claim 2 wherein said elements are wheels for providing grinding operations selected from the group consisting of roughing, semi-finishing and polishing and further comprising means for selectively removing said second element and selectively inserting and removing said plug from said socket.

13. The apparatus according to claim 3 wherein said elements are wheels for providing grinding operations selected from the group consisting of roughing, semi-finishing and polishing and further comprising means for selectively changing said second and third elements and selectively inserting and removing said plug from said socket.

14. The apparatus according to claim 4 wherein said elements are wheels for providing grinding operations selected from the group consisting of roughing, semi-finishing and polishing and further comprising means for selectively changing said second and third elements and selectively inserting and removing said plug from said socket.

15. The apparatus according to claim 5 wherein said elements are wheels for providing grinding operations selected from the group consisting of roughing, semi-finishing and polishing and further comprising means for selectively changing said second and third elements and selectively inserting and removing said plug from said socket.

16. The apparatus according to claim 1 wherein said elements are wheels for providing grinding operations selected from the group consisting of finishing, roughing or semi-finishing, and polishing, said first element being attached to said spindle, and wherein said first element grinding wheel has an annular member which contains an abrasive comprising diamond particles which presents said first grinding surface.

17. The apparatus according to claim 2 wherein said elements are wheels for providing grinding operations selected from the group consisting of finishing, roughing or semi-finishing, and polishing, said first element being attached to said spindle, and wherein said first element grinding wheel has an annular member which contains an abrasive comprising diamond particles which presents said first grinding surface.

18. The apparatus according to claim 3 wherein said elements are wheels for providing grinding operations selected from the group consisting of finishing, roughing or semi-finishing, and polishing, said first element being attached to said spindle, and wherein said first element grinding wheel has an annular member which contains an abrasive comprising diamond particles which presents said first grinding surface.

19. The apparatus according to claim 4 wherein said elements are wheels for providing grinding operations selected from the group consisting of finishing, roughing or semi-finishing, and polishing, said first element being attached to said spindle, and wherein said first element grinding wheel has an annular member which contains an abrasive comprising diamond particles which presents said first grinding surface.

20. The apparatus according to claim 5 wherein said elements are wheels for providing grinding operations selected from the group consisting of finishing, roughing or semi-finishing, and polishing, said first element being attached to said spindle, and wherein said first element grinding wheel has an annular member which contains an abrasive comprising diamond particles which presents said first grinding surface.

21. The apparatus according to claim 1 wherein said elements are wheels for providing grinding operations selected from the group consisting of finishing, roughing or semi-finishing, and polishing, said first element being attached to said spindle, and wherein said spindle has an axis of rotation, said wheels and shank also have an axis of rotation which are disposed along the axis of rotation of said spindle when mounted thereon.

22. The apparatus according to claim 2 wherein said elements are wheels for providing grinding operations selected from the group consisting of finishing, roughing or semi-finishing, and polishing, said first element being attached to said spindle, and wherein said spindle has an axis of rotation, said wheels and shank and plug also have an axis of rotation which are disposed along the axis of rotation of said spindle when mounted thereon.

23. The apparatus according to claim 3 wherein said elements are wheels for providing grinding operations selected from the group consisting of finishing, roughing or semi-finishing, and polishing, said first element being attached to said spindle, and wherein said spindle has an axis of rotation, said wheels and shank also have an axis of rotation which are disposed along the axis of rotation of said spindle when mounted thereon.

24. The apparatus according to claim 4 wherein said elements are wheels for providing grinding operations selected from the group consisting of finishing, roughing or semi-finishing, and polishing, said first element being attached to said spindle, and wherein said spindle has an axis of rotation, said wheels and shank and plug also have an axis of rotation which are disposed along the axis of rotation of said spindle when mounted thereon.

25. The apparatus according to claim 5 wherein said elements are wheels for providing grinding operations selected from the group consisting of finishing, roughing or semi-finishing, and polishing, said first element being attached to said spindle, and wherein said spindle has an axis of rotation, said wheels and shank and plug also have an axis of rotation which are disposed along the axis of rotation of said spindle when mounted thereon.

26. The apparatus according to claim 1 wherein said elements are wheels for providing grinding operations selected from the group consisting of finishing, roughing or semi-finishing, and polishing, said first element being attached to said spindle, and wherein said first element is a grinding wheel comprising a disk, screw means connecting said disk semi-permanently to said spindle, a ring of abrasive material, means attaching said ring to said disk on a side thereof facing forwardly away from said spindle to present said first grinding surface.

27. The apparatus according to claim 2 wherein said elements are wheels for providing grinding operations selected from the group consisting of finishing, roughing or semi-finishing, and polishing, said first element being attached to said spindle, and wherein said first element is a grinding wheel comprising a disk, screw means connecting said disk semi-permanently to said spindle, a ring of abrasive material, means attaching said ring to said disk on a side thereof facing forwardly away from said spindle to present said first grinding surface.

28. The apparatus according to claim 3 wherein said elements are wheels for providing grinding operations selected from the group consisting of finishing, roughing or semi-finishing, and polishing, said first element being attached to said spindle, and wherein said first element is a grinding wheel comprising a disk, screw means connecting said disk semi-permanently to said spindle, a ring of abrasive material, means attaching said ring to said disk on a side thereof facing forwardly away from said spindle to present said first grinding surface.

29. The apparatus according to claim 4 wherein said elements are wheels for providing grinding operations selected from the group consisting of finishing, roughing or semi-finishing, and polishing, said first element being attached to said spindle, and wherein said first element is a grinding wheel comprising a disk, screw means connecting said disk semi-permanently to said spindle, a ring of abrasive material, means attaching said ring to said disk on a side thereof facing forwardly away from said spindle to present said first grinding surface.

30. The apparatus according to claim 5 wherein said elements are wheels for providing grinding operations selected from the group consisting of finishing, roughing or semi-finishing, and polishing, said first element being attached to said spindle, and wherein said first element is a grinding wheel comprising a disk, screw means connecting said disk semi-permanently to said spindle, a ring of abrasive material, means attaching said ring to said disk on a side thereof facing forwardly away from said spindle to present said first grinding surface.

* * * * *